US012677870B2

(12) United States Patent
Hall et al.

(10) Patent No.: US 12,677,870 B2
(45) Date of Patent: Jul. 14, 2026

(54) SMOKELESS ARTICLE

(71) Applicant: Imperial Tobacco Limited, Bristol (GB)

(72) Inventors: Steven Hall, Liverpool (GB); Haydn Jones, Liverpool (GB)

(73) Assignee: Imperial Tobacco Limited, Bristol (GB)

( * ) Notice: Subject to any disclaimer, the term of this patent is extended or adjusted under 35 U.S.C. 154(b) by 557 days.

(21) Appl. No.: 17/697,326

(22) Filed: Mar. 17, 2022

(65) Prior Publication Data

US 2022/0202071 A1 Jun. 30, 2022

Related U.S. Application Data

(63) Continuation of application No. PCT/EP2020/075907, filed on Sep. 16, 2020.

(30) Foreign Application Priority Data

Sep. 19, 2019 (EP) .................................... 19198288

(51) Int. Cl.
*A24B 15/18* (2006.01)
*A24F 23/02* (2006.01)
*B05D 1/02* (2006.01)

(52) U.S. Cl.
CPC ............ *A24F 23/02* (2013.01); *A24B 15/186* (2013.01); *B05D 1/02* (2013.01)

(58) Field of Classification Search
None
See application file for complete search history.

(56) References Cited

U.S. PATENT DOCUMENTS

2005/0061339 A1* 3/2005 Hansson ................ A24B 15/16 131/352
2009/0022917 A1* 1/2009 Gedevanishvili ...... A24B 13/00 427/430.1

(Continued)

FOREIGN PATENT DOCUMENTS

EP 2 830 622 B1 8/2018
WO WO 2007/084587 A2 7/2007

(Continued)

OTHER PUBLICATIONS

International Search Report and Written Opinion (PCT/EP2020/075907), dated Jan. 20, 2021, 15 pages.

(Continued)

*Primary Examiner* — Michael J Felton
(74) *Attorney, Agent, or Firm* — DUNLAP CODDING, P.C.

(57) ABSTRACT

A smokeless article for oral consumption including a pouch, the pouch including a porous substrate enclosing a content, the content having a nicotinic compound, wherein the porous substrate has a continuous coatl8ing of a non-porous, saliva-stable material, and wherein the coating is frangible, such that in use the coating fractures on chewing. Also described is a method of manufacturing a smokeless articles for oral consumption the method including applying a coating material to a sheet of a porous substrate to provide a coated sheet of porous substrate, the coated sheet of porous substrate having a continuous coating of a non-porous, saliva-stable material; a forming step; and a sealing step, wherein the coating formed by the coating material is frangible.

14 Claims, 3 Drawing Sheets

(56) References Cited

U.S. PATENT DOCUMENTS

| | | | | |
|---|---|---|---|---|
| 2012/0291794 | A1* | 11/2012 | Kawata | A24B 13/00 131/352 |
| 2013/0340773 | A1* | 12/2013 | Sebastian | A24B 15/186 131/111 |
| 2016/0073689 | A1 | 3/2016 | Sebastian et al. | |
| 2016/0366934 | A1* | 12/2016 | Wiberg | A24F 23/02 |
| 2017/0225143 | A1 | 8/2017 | Karles et al. | |
| 2020/0128870 | A1* | 4/2020 | Hassler | A24B 15/16 |

FOREIGN PATENT DOCUMENTS

| | | | |
|---|---|---|---|
| WO | WO 2009/010875 | A2 | 1/2009 |
| WO | WO 2013/192519 | A1 | 12/2013 |

OTHER PUBLICATIONS

International Search Report (19198288.3-1105), dated Feb. 7, 2020, 9 pages.

* cited by examiner

SMOKELESS ARTICLE

CROSS-REFERENCE TO RELATED APPLICATIONS/INCORPORATION BY REFERENCE STATEMENT

This application is a non-provisional application claiming benefit to the international application no. PCT/EP2020/075907 filed on Sep. 16, 2020, which claims priority to EP 19198288.3 filed on Sep. 19, 2019. The entire contents of each of the above-referenced applications are hereby incorporated herein by reference in their entirety.

FIELD OF THE DISCLOSURE

The present disclosure relates to a smokeless article for oral consumption, and a method of manufacturing a smokeless article for oral consumption.

BACKGROUND

Smoking is generally considered to expose a smoker to potentially harmful substances. It is generally thought that the majority of the potentially harmful substances are formed by the heat generated during burning (combustion) of the article. There is interest in so-called heat not burn products, which heat a tobacco or similar substrate at a lower temperature than a conventional cigarette. These products are usually described as less harmful than conventional cigarettes. Both conventional cigarettes and heat not burn products are visible during use and produce smoke or vapor.

As a result of these considerations and because of consumer preferences, it is desirable to find and improve alternative substance delivery routes that continue to meet user expectations. Smokeless articles are a suitable alternative because they do not require heating for substance delivery to the user. Instead, smokeless articles rely on saliva to extract soluble substances, typically nicotine and/or flavors, from tobacco contained within the smokeless article.

Conventional smokeless articles have a saliva permeable pouch housing a content. The content is generally in the form of tobacco. Said tobacco containing a soluble element, typically nicotine. Such a product may be referred to as portion snus. It is typically provided as prepackaged (traditionally moist) powder in small teabag-like pouches. Each pouch is a single portion or unit. This moistened product may be referred to as original snus.

Smokeless articles are placed in the mouth where saliva extracts the soluble element from the tobacco contained within. Typically, the smokeless article is placed in the oral cavity, sublingually or in the oral vestibule (between the teeth and lips/cheeks). The user may assist extraction by oral manipulation, such as by chewing and/or sucking or pressing on the outside of the mouth to squeeze the pouch.

The resulting saliva, which contains extracts, subsequently contacts a mucous membrane in the mouth, or at another point of the gastrointestinal tract, to deliver the soluble element across the membrane and into the bloodstream. The soluble element is then transported by the bloodstream to the site of action. For example, nicotine is delivered to the brain where it acts upon acetylcholine receptors.

The above-described extraction and delivery process continues until the soluble element is depleted from the smokeless article. The smokeless article must then be removed from the mouth and disposed of.

Some commercially available smokeless articles contain snuff. Snuff is smokeless tobacco made from ground or pulverized tobacco leaves. Snuff is available in dry form or wet (moist) form. Moist snuff may be referred to as snus. Two common varieties of snus are Scandinavian snus and American snus. Both varieties of snus are available in a loose form, but are often contained within a saliva permeable pouch.

Typically, production of snus is achieved by grinding a blend of leaf tobaccos to specified particle sizes. The ground tobacco is then mixed with water and sodium chloride in closed process blenders. The mixture is subjected to a heat treatment, involving temperatures up to 80-100° C., for several hours to pasteurize the snus. Thereafter, the snus is cooled and other ingredients may be added. Snus is typically manufactured to meet the GothiaTek® standard, as detailed in "Swedish snus and the GothiaTek® standard" (2005), Rutqvist, et al.

The World Health Organisation states that smokeless articles are considerably less hazardous than cigarettes. Action on Smoking and Health considers smokeless articles to be about one hundred times less harmful than cigarettes. Smokeless articles are therefore thought to provide a healthier alternative for smokers.

There is a need for improved design of smokeless articles to enhance the user experience and improve the function of its constituent components.

The present disclosure has been devised in the light of the above considerations.

SUMMARY OF THE DISCLOSURE

As used herein, the term "content(s)" is intended to refer to compounds, material and/or substances that may be enclosed within the pouch.

As used herein, the term "nicotinic compound" is intended to refer to nicotine, nicotine salt(s), nicotine complex(es); and/or nicotine solvate(s).

As used herein, the term "non-porous" is intended to refer to a material that does not include any pores extending through the thickness of the wall (for instance, "through holes" or capillaries).

As used herein, the term "saliva-stable" is intended to refer to a material that does not substantially dissolve or disintegrate as a result of exposure to saliva in the oral cavity of the user at physiological temperature. Therefore, a layer of such material is resistant to the migration of saliva (or compounds/substances dissolvable in saliva, for example nicotinic compounds) through the thickness of the material. The material may also be resistant to migration of saliva (or compounds/substances dissolvable in saliva, e.g., nicotinic compounds) by phase transfer mechanisms. In some cases, a standard commercially available artificial saliva may be used to test saliva-stability.

Alternatively, "saliva-stable" may equate to "water-stable" and refer to a material that does not substantially dissolve or disintegrate as a result of exposure to water in the oral cavity of the user at physiological pH. In such cases, a layer of the material is resistant to the migration of water (or compounds/substances dissolvable in water, for example nicotinic compounds) through the thickness of the material. The material may also be resistant to migration of water (or compounds/substances dissolvable in water, e.g., nicotinic compounds) by phase transfer mechanisms.

As used herein, the term "saliva" is intended to refer to the liquid substance formed in the mouth of animals, such as humans, that includes water, electrolytes and enzymes.

Other components of saliva may include mucus, white blood cells, epithelial cells and/or antimicrobial agents.

As used herein, the term "hydrophobic" is intended to refer to a material having water contact angle greater than 90°, such that the material is resistant to adsorption and/or absorption of water. In some instances, such material may have a polarity lower than that of water.

As used herein, the term "plant material" is intended to refer to a portion and/or part(s) of a plant (e.g., leaf, stem, flower or bud). The plant material may be processed (for example, by shredding, grinding or drying) or it may be non-processed (that is, used whole). The plant material is typically fibrous (comprising or characterized by fibers). For the avoidance of doubt, the term "plant material" is not intended to include pulp and/or paper which is derived from a plant material (typically wood) and chemically and/or mechanically processed to extract fibers before use.

As used herein, the term "moisture content" may include water, humectants, liquid flavorants and/or other liquid compounds.

As used herein, the term "oral consumption" is intended to refer to any oral administration route achieved by placing the smokeless article into the oral cavity. This includes, but is not limited to, buccal, sub-lingual, periodontal, gingival and ingestion.

According to a first aspect there is provided a smokeless article for oral consumption comprising a pouch, the pouch comprising a porous substrate enclosing a content, the content comprising a nicotinic compound, wherein the porous substrate has a continuous coating of a non-porous, saliva-stable material, and wherein the coating is frangible, such that in use the coating fractures on chewing.

In this the way, when the smokeless article is inserted into the user's mouth the coating of a non-porous, saliva-stable material prohibits migration of saliva (or water) into the content of the pouch. The non-porous, saliva-stable material also acts to prohibit migration of the nicotinic compound from the content of the pouch into the user's oral cavity. Therefore, release of the nicotinic compound from the pouch into the user's oral cavity is prevented. The frangible nature of the coating enables the user to bite down or chew on the pouch to break the coating. This exposes a portion of porous substrate that was previously covered by the coating, and facilitates migration of saliva (or water) from the user's oral cavity into the content of the pouch. Subsequently, the saliva extracts soluble components contained within the content (in particular, the nicotinic compound), and delivers the extracted components from the pouch into the user's oral cavity. This means the user has complete control over when the release of the nicotinic compound is initiated. For instance, when a nicotine "hit" is desired by the user, they can simply bite down on the pouch to break the frangible coating and initiate release of the nicotinic compound.

Furthermore, the presence of the continuous coating of non-porous, saliva-stable material imparts an additional benefit that the loss of moisture from the content of the pouch prior to use is retarded. The coating retards or prevents the passage of moisture with the result that the rate of loss of moisture from the content over time is reduced as compared to a smokeless article having no such coating or in which the coating is breached; providing a smokeless article having a longer shelf-life.

Preferably, the coating is located on an inner surface of the porous substrate; in some cases, exclusively on the inner surface of the porous substrate.

In this way, the coating is shielded from premature breakage as it is contained on a surface that is within the enclosed volume of the pouch.

Preferably, the coating is located on an outer surface of the porous substrate; in some cases, exclusively on the outer surface of the porous substrate.

In this way, the coating may provide an improved mouth-feel to the user because, in use, the coating is in direct contact with the user's oral cavity. For instance, the coating may provide a surface that feels smoother against the user's oral cavity, e.g., as compared to the porous substrate.

As used herein "inner surface" is intended to refer to the surface of the porous substrate that is closest to the content contained within the pouch. As used herein, the term "outer surface" is intended to refer to the surface of the porous substrate furthest away from the content contained within the pouch.

Preferably, the non-porous, saliva-stable material comprises a polymer.

In this way, the physical properties of the non-porous, saliva-stable material can easily be tuned by selection of an appropriate polymer. This is advantageous from a manufacturing and processability perspective. It is also advantageous from the perspective of use of the article. For example, the degree of frangibility of the coating can be tuned be selection of an appropriate polymer.

Preferably, the polymer is selected from sorbitol, maltitol, isomalt, mannitol, starch, gelatin, gum arabic, polyvinyl acetate, carob bean gum, refined paraffin wax, shellac, locust bean gum, petroleum wax, terpene resin, tragacanth, polyethylene, xanthan gum, and combinations thereof.

In this way, a coating with suitable structural and physical properties can be provided.

Preferably, essentially the entire enclosed volume of the pouch is defined by the porous substrate.

In this way, once the frangible coating has broken, maximum surface area is provided for saliva (or water) from the user's oral cavity to migrate through the porous membrane and contact the content contained within the pouch.

Preferably, the non-porous, saliva-stable material is hydrophobic.

In this way, the coating more effectively repels saliva (or water) to prevent the migration of saliva (or water) through the porous substrate.

Preferably, the content is tobacco-free.

In this way, the user may experience a similar or enhanced recreational/pharmaceutical effect as compared to conventional tobacco-containing products without experiencing undesirable components inherent to tobacco (e.g., tobacco flavor).

The coating may be applied to the porous substrate by any suitable means, for example, brushing, spraying, or immersion. It is preferred that the coating is uniform across a surface of the porous substrate.

Preferably, the coating is applied by spray coating.

In this way, a more uniform application of the coating is achieved. This provides a more consistent user experience.

According to a second aspect there is provided a method of manufacturing a smokeless article for oral consumption comprising:

(i) applying a coating material to a sheet of a porous substrate to provide a coated sheet of porous substrate, the coated sheet of porous substrate having a continuous coating of a non-porous, saliva-stable material;

(ii) forming the coated sheet of porous substrate around a content to provide a pouch; and (iii) thermally or chemically sealing the pouch to enclose the contents wherein the coating formed by the coating material is frangible.

In this way, a method of manufacturing a smokeless article having the advantageous properties as listed in the first aspect is provided. Furthermore, by applying the coating material to a sheet of a porous substrate before the forming and/or sealing steps a greater degree of flexibility is provided in the manufacturing of the smokeless articles. For instance, the coating material may be applied to the sheet of a porous substrate on a surface intended to be the inner surface of the porous substrate when it is made into a pouch. Alternatively, the coating material may be applied to the sheet of a porous substrate on a surface intended to be the outer surface of the porous substrate when it is made into a pouch. Alternatively, the coating material may be applied to both of said surfaces. The coating material is typically applied to the porous substrate sheet in a spreadable or sprayable state, for example as a liquid or paste. After application, the coating material then becomes frangible over time, for example upon curing or evaporation of solvent. In some cases, the coated sheet of porous substrate is formed into a pouch before the coating material becomes frangible, this reduces the incidence of cracking or other breaching of the coating upon formation of the pouch. This may involve formation of a pouch that is still open along at least a portion of at least one side to allow contents to be filled into the pouch, or it may involve complete formation and filling of the closed pouch before the coating material becomes frangible. As such the method may further include a step of curing or allowing solvent to evaporate from the coating material to form a frangible coating. This step may occur between steps (i) and (ii) above; or between steps (ii) and (iii) above; or following step (iii) above.

Preferably, in step (ii) the coated sheet of porous substrate is arranged such that the coating of the non-porous, saliva-stable material is provided on an inner surface of the porous substrate.

In this way, the frangible coating of the resultant smokeless article is protected from pre-mature breakage during storage and/or use.

Preferably, the coating material is applied by spray-coating.

In this way, a more uniform application of coating material is achieved. It follows that a more consistent user experience is achieved.

According to a third aspect there is provided a smokeless article for oral consumption produced by a process according to the second aspect.

According to a fourth aspect there is provided a kit comprising a plurality of smokeless articles according to the first aspect and/or the third aspect and a container.

According to a fifth aspect there is provided use of the smokeless article according to either the first aspect and/or the third aspect.

The smokeless article may be described as a snus article.

The smokeless article preferably has a mass of about 0.1 g to 5.0 g, such as about 0.5 g to about 4.0 g or about 1.0 g to about 3.0 g.

The smokeless article preferably has a length of about 30 mm, such as about 28 mm or 26 mm, a width of about 12 mm, such as about 10 mm or 8 mm, and a depth of about 5 mm, such as about 4 mm or 3 mm.

The porous substrate may be comprised of one or more materials. The porous substrate may be comprised of fiber, paper, cloth and fabric or combinations thereof. The porous substrate may be comprised of one or more polymeric materials. The polymeric material may be selected from one or more of hydroxypropyl cellulose (HPC), hydroxypropyl methylcellulose (HPMC), polyvinyl alcohol (PVOH), polyvinylpyrrolidone (PVP), polyethylene oxide (PEO) hydroxyethyl cellulose (HEC), polyethylene glycol (PEG), pullulan, sodium alginate, xanthan gum, tragancanth gum, guar gum, acacia gum, arabic gum, polyacrylic acid, maltodextrin, methylmethacrylate copolymer, carboxyvinyl copolymers, starch and gelatin.

The porous substrate is typically completely insoluble in saliva. Suitable insoluble porous substrate materials include, but are not limited to, fiber, paper, water-insoluble polymers, cloth and fabric. Suitable soluble porous substrate materials include, but are not limited to, water-soluble polymers such as polyethylene oxide (PEO), hydroxypropyl cellulose (HPC) and hydroxypropyl methylcellulose (HPMC).

The pouch may be formed by, for example, folding a single sheet of porous substrate on itself or bringing two or more sheets of a porous substrate together and sealing the edges. The edges may initially be partially sealed to provide an open pouch in which the content may be placed before completely sealing the pouch closed. The sheets may be the same thickness or different thicknesses.

Preferably, at least 50% of the pores of the porous substrate have a diameter of 50 μm to 200 μm, such as 100 μm to 175 μm or 125 μm or 150 μm. At least 50% of the pores have a diameter of at least 100 μm. For example, at least 55%, 60%, 65%, 70%, 75%, 80%, 85%, 90%, 95% or 100% of the pores have such diameters.

The pouch may be colored or include markings, such as brand logos and text, to improve user perception. The pouch may be partially or completely colored by a colorant.

The content may comprise one or more substances.

The or each substance may individually be a biologically/pharmacologically active compound, pH stabilizers or adjusters, humectants, flavorants, fillers, preservatives, aqueous/non-aqueous solvents and binders. The or each substance may be provided for more than one purpose.

The content of the pouch (i.e., the ingredients, material and/or substances enclosed within the pouch) preferably occupies substantially all of the internal volume of the pouch. The content may occupy 80%, 85%, 90%, 95% or 100% of the internal volume of the pouch. The content may comprise a solid material to provide physical integrity, such as an organic material (e.g. plant material) or an inorganic material. Such solid materials may naturally or inherently contain one or more biologically/pharmacologically active compounds and/or additives.

Biologically/pharmacologically active compounds are provided to produce a pharmacological effect in the user. Suitable biologically/pharmacologically active compounds include the group consisting of: nicotine, cocaine, caffeine, opiates and opioids, cathine and cathinone, kavalactones, mysticin, beta-carboline alkaloids, salvinorin A together with any combinations, functional equivalents to, and/or synthetic alternatives of the foregoing. Biologically/pharmacologically active compounds may also have additive properties.

The content may include a nicotine salt. For example, the content may include a nicotine salt selected from the group consisting of nicotine hydrochloride, nicotine dihydrochloride, nicotine monotartrate, nicotine bitartrate, nicotine bitartrate dehydrate, nicotine sulfate, nicotine zinc chloride monohydrate, nicotine salicylate and mixtures thereof.

pH stabilizers or adjusters may be provided to adjust the user experience and/or modify the bioavailability of a pharmacologically active compound. For instance, under acidic conditions, nicotine is protonated and does not readily cross mucous membranes. Examples of suitable pH stabilizers include ammonia, ammonium carbonate, sodium carbonate and calcium carbonate. The overall pH of the smokeless article is preferably pH 7 to pH 9, such as pH 7.25 to pH 8.75 or pH 7.5 to pH 8.5.

The overall pH of a smokeless article may be determined by, for example, (i) placing the content of the smokeless article in 10 mL of distilled water (iii) agitating the mixture for at least 5 minutes and (iv) measuring the pH of the solution with a pH probe.

Fillers may be provided to increase the volume of the smokeless article (e.g., by increasing the volume contained within the pouch and to strengthen the content). Suitable fillers include calcium carbonate, calcium phosphate, corn starch, grains, lactose, polysaccharides (e.g., maltodextrin), polyols, sugars (e.g., dextrose, manitol, xylitol, sorbitol), natural fibers (e.g., non-tobacco fibers), microcrystalline cellulose, cellulose and cellulose derivatives (e.g., finely divided cellulose), lignocellulose fibers (e.g., wood fibers), jute fibers and combinations thereof. In some cases, the amount of filler is 5 to wt % of the content, e.g., around 6 to 9 wt %.

Flavorants may be provided in solid or liquid form. Suitable flavorants include coffee, eucalyptus, menthol, licorice, peppermint, spearmint, chocolate, fruit flavor (including, e.g., citrus, cherry etc.), vanilla, spice (e.g., ginger, cinnamon) and tobacco flavor. The flavorant may be evenly dispersed throughout the content or may be provided in isolated locations and/or varying concentrations throughout the content. As used herein, the term “flavorant” denotes a compound having a desirable taste, aroma or both.

Humectants may be provided to control moisture content thereby preventing the smokeless article from drying out during storage and reducing the amount of saliva wetting required before the user experience begins. Suitable humectants include polyhydric alcohols (e.g., propylene glycol (PG), triethylene glycol, 1,2-butane diol and vegetable glycerin (VG)) and their esters (e.g. glycerol mono-, di- or tri-acetate).

The humectant may have a lower limit of at least 1% by weight of the content such as at least 2 wt %, such as at least 5 wt %, such as at least 10 wt %, such as at least 20 wt %, such as at least 30 wt %, or such as least 40 wt %.

The humectant may have an upper limit of at most 50% by weight of the contents, such as at most 40 wt %, such as at most 30 wt %, or such as at most 20 wt %, such as at most 10 wt %, such as at most 5 wt %, such as at most 2 wt %.

Preferably, the amount of humectant is 1 to 40 wt % of the content, such as 2 to 20 wt % or 5 to 10 wt %.

Smokeless articles having a total moisture content of 10% or less are generally considered to be ‘dry’. Smokeless articles having a total moisture content of 40% or more are generally considered to be ‘wet’.

Sweeteners may be provided to modify the user taste perception and, in particular, overcome bitter flavors that result from other substances. Suitable sweeteners include honey, sugar, brown sugar, glucose, fructose, sucrose, aspartame, xylitol, maltitol, saccharin sodium, glycyrrhizin tripotassium licorice, jujube or a mixture thereof. The amount of sweetener is in some cases 1 to 20% by weight of the content, such as 2 to 15 wt % or 5 to 10 wt %.

Stabilizers are provided to prevent decomposition or degradation over time during storage by, for example, retarding oxidation or unwanted biological activity. Stabilizers may be selected from the group consisting of antioxidants including vitamin E, such as tocopherole, ascorbic acid, sodium pyrosulfite, butylhydroxytoluene, butylated hydroxyanisole, eidetic acid and salts thereof; and preservatives including citric acid, tartaric acid, lactic acid, malic acid, acetic acid, benzoic acid, sorbic acid and salts thereof.

Binders may be provided. Suitable binders include starches and/or cellulosic binders such as methyl cellulose, ethyl cellulose, hydroxypropyl cellulose, hydroxyethyl cellulose and carboxymethyl cellulose, gums such as xanthan, guar, arabic and/or locust bean gum, organic acids and their salts such as alginic acid (sodium alginate), agar and pectins. In some embodiments the amount of binder is 5 to 10 wt % of the content e.g. around 6 to 9 wt % or 7 to 8 wt %.

Colorants may be provided to modify the user impression of the smokeless article. Colorants include whitening agents. Colorants may be selected from one or more of common colorants such as curcumin (E100), turmeric (E100(ii)), riboflavin (E101), riboflavin-5'-phosphate (E101(ii)), tartrazine (E102), quinoline yellow (E104), riboflavin-5-sodium phosphate (E106), yellow 2G (E107), sunset yellow FCF (E110), carmine, cochineal (E120), azorubine (E122), amaranth (E123), ponceau 4R (E124), erythrosine (E127), red 2G (E128), allura red AC (E129), patent blue V (E131), indigotine (E132), brilliant blue FCF (E133), chlorophylls (E140), copper complexes of chlorophyll (E141), green S (E142), caramel (E150a-d), brilliant black BN (E151), carbon (E153), brown FK (E154), brown HT (E155), alfa-, beta- and gamma-carotene (E160a), annatto, bixin, norbixin (E160b), bell pepper (Paprika) extract (E160c), lycopene (E160d), beta-apo-8'-carotenal (E160e), ethyl ester of beta-apo-8'-carotenic acid (E160f), flavoxanthin (E161a), lutein (E161b), cryptoxanthin (E161c), rubixanthin (E161d), violaxanthin (E161e), rhodoxanthin (E161f), canthaxanthin (E161g), citranaxanthin (E161h), beetroot extract (E162), anthocyanins (E163), calcium carbonate (E170), titanium dioxide (E171), iron oxides (E172), aluminium (E173), silver (E174), gold (E175), lithol rubine BK (E180), tannins (E181). The amount of colorant may be up to about 3% by weight of the smokeless article, such as about 0.5% to about 2.5% or about 1% to about 2%.

Plant material may be provided for physical integrity and may function as a natural source of substances such as, for example, biologically/pharmacologically active compounds, flavorants, pH stabilizers etc. The plant material may comprise least one plant material selected from the list including *Amaranthus dubius, Arctostaphylos uva-ursi* (Bearberry), *Argemone mexicana, Arnica, Artemisia vulgaris,* Yellow Tees, *Galea zacatechichi, Canavalia maritima* (Baybean), *Cecropia mexicana* (Guamura), *Cestrum noctumum, Cynoglossum virginianum* (wild comfrey), *Cytisus scoparius, Damiana, Entada rheedii, Eschscholzia califomica* (California Poppy), *Fittonia albivenis, Hippobroma longiflora, Humulus japonica* (Japanese Hops), *Humulus lupulus* (Hops), *Lactuca virosa* (Lettuce Opium), *Laggera alata, Leonotis leonurus, Leonurus cardiaca* (Motherwort), *Leonurus sibiricus* (Honeyweed), *Lobelia cardinalis, Lobelia inflata* (Indian-tobacco), *Lobelia siphilitica, Nepeta cataria* (Catnip). *Nicotiana* species (Tobacco), *Nymphaea alba* (White Lily), *Nymphaea caerulea* (Blue Lily), Opium poppy, *Passiflora incarnata* (Passionflower), *Pedicularis densiflora* (Indian Warrior), *Pedicularis groenlandica* (Elephant’s Head), *Salvia divinorum, Salvia dorrii* (Tobacco Sage), *Salvia* species (Sage), *Scutellaria galericulata, Scutellaria lateriflora, Scutellaria nana, Scutellaria* species (Skullcap), *Sida acuta* (Wireweed), *Sida rhombifolia, Silene capensis, Syzygium aromaticum* (Clove), *Tagetes lucida* (Mexican Tarragon), *Tarchonanthus camphoratus, Tumera*

*diffusa* (Damiana), *Verbascum* (Mullein), *Zamia latifolia* (Maconha Brava) together with any combinations, functional equivalents to, and/or synthetic alternatives of the foregoing.

The plant material may be tobacco. Any type of tobacco may be used. This includes, but is not limited to, flue-cured tobacco, burley tobacco, Maryland Tobacco, dark-air cured tobacco, oriental tobacco, dark-fired tobacco, perique tobacco and rustica tobacco. This also includes blends of the above mentioned tobaccos.

Any suitable parts of the tobacco plant may be used. This includes leaves, stems, roots, bark, seeds and flowers.

The tobacco may comprise one or more of leaf tobacco, stem tobacco, tobacco powder, tobacco dust, tobacco derivatives, expanded tobacco, homogenized tobacco, shredded tobacco, extruded tobacco, cut rag tobacco and/or reconstituted tobacco (e.g., slurry recon or paper recon).

The content may comprise at least 50 wt % plant material based on the weight of the content, e.g., at least 60 wt % plant material, e.g., around 65 wt % plant material. The content may comprise 80 wt % or less plant material, e.g., 75 or 70 wt % or less plant material.

The content may comprise a gathered sheet of homogenized (e.g., paper/slurry recon) tobacco or gathered shreds/strips formed from such a sheet.

The sheet may have a grammage greater than or equal to 100 $g/m^2$, e.g., greater than or equal to 110 $g/m^2$ such as greater than or equal to 120 $g/m^2$. The sheet may have a grammage of less than or equal to 300 $g/m^2$, e.g., less than or equal to 250 $g/m^2$ or less than or equal to 200 $g/m^2$. The sheet may have a grammage of between 120 and 190 $g/m^2$.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

SUMMARY OF THE FIGURES

Embodiments and experiments illustrating the principles of the disclosure will now be discussed with reference to the accompanying figures in which.

DETAILED DESCRIPTION OF THE DISCLOSURE

Figure 1:
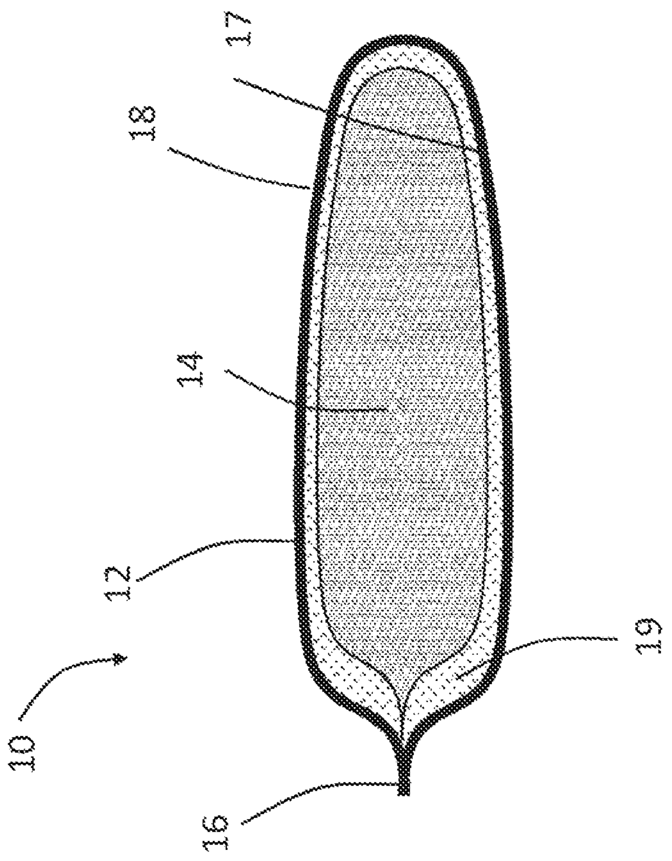
FIG. 1. shows a cross-sectional view of a first embodiment of a smokeless article.

As shown in FIG. 1 there is provided a first embodiment of a smokeless article 10 having a pouch 12, the pouch being a porous substrate having an inner surface 17 and an outer surface 18. The pouch 12 contains a content 14 including a nicotinic compound. The pouch 12 is substantially rectangular. The pouch 12 is formed from a single sheet of a porous substrate and is substantially filled by the content 14. The pouch 12 has a seal 16 along each of the three edges where the inner surface 17 of the single sheet of porous substrate meets itself to seal the contents 14 in the pouch 12. The inner surface 17 of the porous substrate has a continuous coating 19 of a non-porous, saliva-stable material between the content 14 and the pouch 12. The coating 19 being frangible.

In use, the smokeless article 10 is placed into the oral cavity of the user. Due to the coating 19, saliva present in the user's oral cavity is prohibited from contacting the content 14 contained within the pouch. Nor can the nicotinic compound in the content 14 migrate through the coating 19. When the user desires a nicotine "hit" they bite down or chew on the smokeless article to break the coating 19. This exposes a portion of the porous substrate of the pouch, such that saliva can migrate through the porous substrate and contact the content 14 contained within. A nicotinic compound within the content 14 is then extracted into the saliva and may enter the user's blood stream by oral consumption to provide a nicotine "hit".

Figure 2:
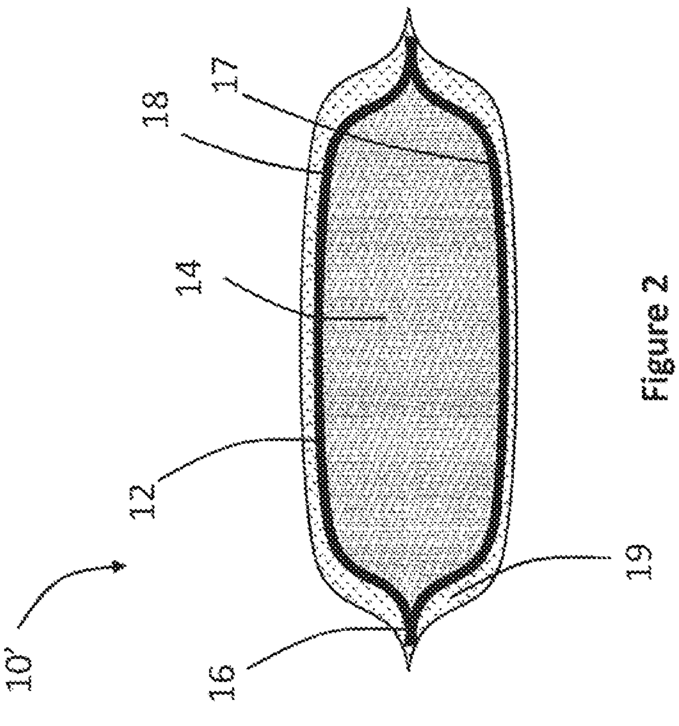
FIG. 2. shows a cross-sectional view of a second embodiment of a smokeless article.

FIG. 2 shows a second embodiment of a smokeless article 10' having a pouch 12, the pouch being a porous substrate having an inner surface 17 and an outer surface 18. The pouch 12 contains a content 14 including a nicotinic compound. The pouch 12 is substantially circular. The pouch 12 is formed from two opposing sheets of a porous substrate and is substantially filled by the content 14. The pouch 12 has a circumferential seal 16 along the edges where the two opposing sheets of a porous substrate meet to seal the contents 14 in the pouch 12. The outer surface 18 of the porous substrate has a continuous coating 19 of a non-porous, saliva-stable material surrounding the pouch 12. The coating 19 being frangible.

Figure 3:
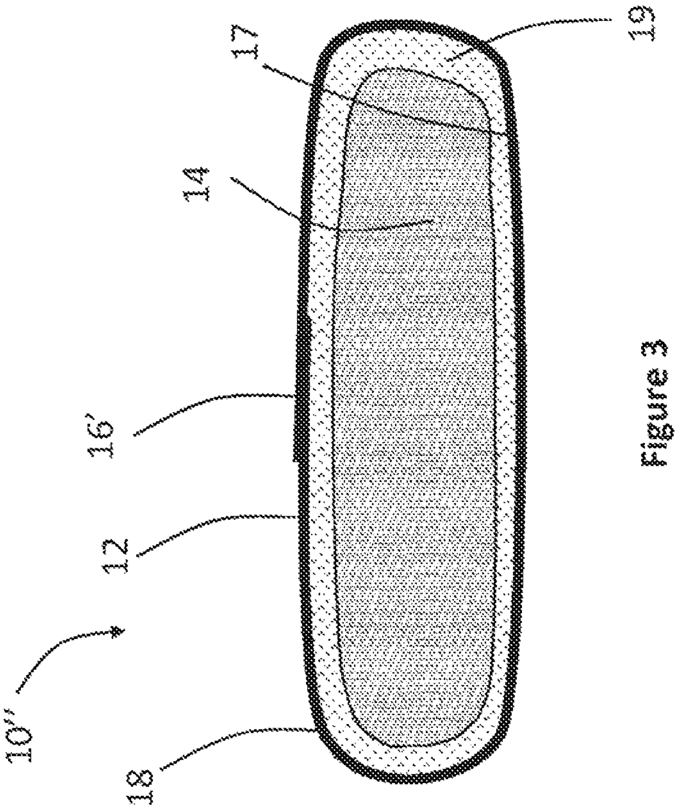
FIG. 3. shows a cross-sectional view of a third embodiment of a smokeless article.

FIG. 3 shows a third embodiment of a smokeless article 10" that, like the first embodiment, has a pouch 12 made from a single sheet of a porous substrate. However, one of the three seals 16' is formed by an overlap of the inner surface 17 and the outer surface 18 of the single sheet of porous substrate to seal the contents 14 in the pouch 12. The remaining two seals at opposing ends of the pouch are formed where the inner surface 17 of the single sheet of porous substrate meets itself. The inner surface 17 of the porous substrate has a continuous coating 19 of a non-porous, saliva-stable material between the content 14 and the pouch 12. The coating 19 being frangible.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the scope of the disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the words "have", "comprise", and "include", and variations such as "having", "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means, for example, +/−10%.

The words "preferred" and "preferably" are used herein refer to embodiments of the disclosure that may provide certain benefits under some circumstances. It is to be appreciated, however, that other embodiments may also be preferred under the same or different circumstances. The recitation of one or more preferred embodiments therefore does not mean or imply that other embodiments are not useful, and is not intended to exclude other embodiments from the scope of the disclosure, or from the scope of the claims.

What is claimed is:

1. A smokeless article for oral consumption comprising a pouch, the pouch comprising a porous substrate enclosing a content which is tobacco-free, the content comprising a nicotinic compound, wherein the porous substrate has a coating of a non-porous, saliva-stable material, wherein the coating is located on at least one of the entire inner surface or entire outer surface of the porous substrate; and wherein the coating is frangible, such that in use the coating fractures on chewing; and wherein the saliva-stable material is a material that does not substantially dissolve or disintegrate as a result of exposure to saliva in an oral cavity of a user at physiological temperature.

2. The smokeless article of claim 1, wherein the coating is located on the entire inner surface of the porous substrate.

3. The smokeless article of claim 1, wherein the coating is located on the entire outer surface of the porous substrate.

4. The smokeless article of claim 1, wherein the non-porous, saliva-stable material comprises a polymer.

5. The smokeless article of claim 4, wherein the polymer is selected from sorbitol, maltitol, isomalt, mannitol, starch, gelatin, gum arabic, polyvinyl acetate, carob bean gum, refined paraffin wax, shellac, locust bean gum, petroleum wax, terpene resin, tragacanth, polyethylene, xanthan gum, and combinations thereof.

6. The smokeless article of claim 1, wherein essentially an entire enclosed volume of the pouch is defined by the porous substrate.

7. The smokeless article of claim 1, wherein the non-porous, saliva-stable material is hydrophobic.

8. The smokeless article of claim 1, wherein the coating is applied by spray coating.

9. A method of manufacturing a smokeless article for oral consumption comprising:

(i) applying a coating material to a sheet of a porous substrate to provide a coated sheet of porous substrate, the coated sheet of porous substrate having a coating of a non-porous, saliva-stable material;

(ii) forming the coated sheet of porous substrate around a content to provide a pouch such that the coated material is located on at least one of the entire inner surface or entire outer surface of the porous substrate, wherein the content is tobacco-free; and (iii) thermally or chemically sealing the pouch to enclose the contents;

wherein the coating formed by the coating material is frangible, such that in use the coating fractures on chewing; wherein the coating is located on the at least one entire inner surface or entire outer surface of the porous substrate; and wherein the saliva-stable material is a material that does not substantially dissolve or disintegrate as a result of exposure to saliva in an oral cavity of a user at physiological temperature.

10. The method of claim 9, wherein in step (ii) the coated sheet of porous substrate is arranged such that the coating of the non-porous, saliva-stable material is provided on an inner surface of the porous substrate.

11. The method of claim 9, wherein the coating material is applied by spray-coating.

12. A smokeless article for oral consumption produced by a process according to claim 9.

13. A kit comprising a plurality of smokeless articles according to claim 1 and a container.

14. Use of the smokeless article according to claim 1 as a smoking substitute device.

* * * * *